(12) United States Patent
Prasanna Kumar et al.

(10) Patent No.: US 10,140,347 B2
(45) Date of Patent: Nov. 27, 2018

(54) EXPOSING DATA TO QUERY GENERATING APPLICATIONS USING USAGE PROFILES

(71) Applicant: Telefonaktiebolaget L M Ericsson (publ), Stockholm (SE)

(72) Inventors: Manoj Prasanna Kumar, Chennai (IN); Brindha Padmanaabhan, Chennai (IN); Subramanian Shivashankar, Chennai (IN); Jawad Mohamed Zahoor, Chennai (IN)

(73) Assignee: TELEFONAKTIEBOLAGET L M ERICSSON ( PUBL), Stockholm (SE)

( * ) Notice: Subject to any disclaimer, the term of this patent is extended or adjusted under 35 U.S.C. 154(b) by 337 days.

(21) Appl. No.: 14/652,969

(22) PCT Filed: Dec. 19, 2012

(86) PCT No.: PCT/SE2012/051424
§ 371 (c)(1),
(2) Date: Jun. 17, 2015

(87) PCT Pub. No.: WO2014/098662
PCT Pub. Date: Jun. 26, 2014

(65) Prior Publication Data
US 2015/0339361 A1 Nov. 26, 2015

(51) Int. Cl.
*G06F 17/30* (2006.01)
*G06F 21/62* (2013.01)
*H04L 29/06* (2006.01)

(52) U.S. Cl.
CPC .. *G06F 17/30566* (2013.01); *G06F 17/30424* (2013.01); *G06F 21/6218* (2013.01); *G06F 2221/2137* (2013.01); *H04L 63/102* (2013.01)

(58) Field of Classification Search
CPC ........ G06F 17/30864; G06F 17/30867; G06Q 30/02
(Continued)

(56) References Cited

U.S. PATENT DOCUMENTS 6,343,287 B1 * 1/2002 Kumar .............. G06F 17/30557
7,702,636 B1 * 4/2010 Sholtis .............. G06F 17/30566
707/999.1

(Continued)

FOREIGN PATENT DOCUMENTS

| WO | WO 2005/008358 A2 | 1/2005 |
| WO | WO 2006/104810 A2 | 10/2006 |
| WO | WO 2012/002956 A1 | 1/2012 |

OTHER PUBLICATIONS

International Search Report and Written Opinion of the International Searching Authority, International Application No. PCT/SE2012/051424, dated Dec. 20, 2013.

*Primary Examiner* — Jeff A Burke
*Assistant Examiner* — Thong Vu
(74) *Attorney, Agent, or Firm* — Sage Patent Group

(57) ABSTRACT

A query handling arrangement is disclosed for a federated database system. The database system includes data storing applications configured to store data in corresponding databases. The query handling arrangement includes a query handling device that receives a database query from a query generating application concerning the obtaining of data from the databases, obtains usage profiles regarding allowed use of the data in the databases provided by a usage profile announcing device, investigates the usage profiles, obtains data from the databases according to the obtained usage profiles, and responds to the query with the obtained data.

23 Claims, 4 Drawing Sheets

(58) Field of Classification Search
USPC ........ 707/769, 748, 781, 770, 792; 709/205, 709/219, 227
See application file for complete search history.

(56) References Cited

U.S. PATENT DOCUMENTS

| | | | | |
|---|---|---|---|---|
| 7,984,073 B1* | 7/2011 | Basiago | ............ | G06F 17/30312 707/802 |
| 8,645,424 B2* | 2/2014 | Miller | ................... | G06F 19/322 707/781 |
| 9,256,859 B2* | 2/2016 | Olsen | ....................... | H04L 51/32 |
| 9,886,599 B2* | 2/2018 | Fitzgerald | ............... | G06F 21/88 |
| 2003/0055327 A1* | 3/2003 | Shaw | ....................... | H04L 29/06 600/407 |
| 2005/0193093 A1* | 9/2005 | Mathew | ................. | G06Q 30/02 709/219 |
| 2007/0276795 A1* | 11/2007 | Poulsen | ................. | G06Q 90/00 |
| 2008/0086564 A1* | 4/2008 | Putman | ................... | H04L 29/06 709/227 |
| 2008/0172357 A1* | 7/2008 | Rechis | ................ | G06F 17/3087 |
| 2008/0177839 A1* | 7/2008 | Chang | ................... | G06Q 10/10 709/205 |
| 2009/0177700 A1* | 7/2009 | Grim, III | .......... | G06F 17/30026 |
| 2010/0030734 A1* | 2/2010 | Chunilal | ........... | G06F 17/30867 707/770 |
| 2012/0005273 A1* | 1/2012 | Rathod | ................... | G06Q 10/10 709/204 |
| 2012/0109882 A1* | 5/2012 | Bouse | .................... | G06Q 10/10 707/607 |
| 2012/0185373 A1* | 7/2012 | Grody | ................... | G06Q 40/04 705/37 |
| 2013/0167173 A1* | 6/2013 | Davis | ................ | H04M 1/72533 725/37 |
| 2014/0207794 A1* | 7/2014 | Du | .......................... | H04L 51/32 707/748 |

\* cited by examiner

EXPOSING DATA TO QUERY GENERATING APPLICATIONS USING USAGE PROFILES

CROSS REFERENCE TO RELATED APPLICATION

This application is a 35 U.S.C. § 371 national stage application of PCT International Application No. PCT/SE2012/051424, filed on 19 Dec. 2012, the disclosure and content of which is incorporated by reference herein in its entirety. The above-referenced PCT International Application was published in the English language as International Publication No. WO 2014/098662 A1 on 26 Jun. 2014.

TECHNICAL FIELD

The invention relates to federated database systems. More particularly, the invention relates to a query handling arrangement in a federated database system as well as to a method, computer program and computer program product for handling queries in a federated database system.

BACKGROUND

Systems like mobile telephone systems may comprise a variety of databases of different types, which databases comprise data and may be queried by different query generating applications, such as by core applications in a core network or by third party applications. The database systems may then be divided into different levels or tiers, where there may be a data level, an application level and above this an enterprise level.

In this type of scenario the data may be scattered inside multiple separated subsystems or nodes. However, it may be difficult to define an enterprise wide business process which requires information spread in many such systems.

In such a system there is typically also one or more data storing applications in the application level, where each data storing application may be independent with its own databases to store specific data.

Often different teams develop these applications and so they end up selecting different methods to solve similar data management problems. One of the often-overlooked problems is the means to share processed data (i.e. information) across applications and to higher levels, such as to the enterprise tier.

Each data storing application typically stores data in its own database. The various schemes describing how the data and information is structured inside the database of each application is then typically known only to that application. Sharing of information between applications is basically achieved by sending information events between the applications through proprietary protocols or through standard protocols like SOAP.

Some problems with the above described scenario are

1. The information produced by one application is shared with other applications only through pre-defined protocols, either proprietary or standard protocols like SOAP. So there exists a tight coupling between applications which make changes expensive.

2. Sharing large-scale data is very difficult.

3. Since the data is moved from one database to another in a pre-defined time period, there will be a discrepancy between the actual data and the shared data.

There is therefore a need for improvement with regard to some or all of the above-mentioned problems.

SUMMARY

One object of the invention is thus to provide an improvement in the handling of queries in a federated database system.

This object is according to a first aspect of the invention achieved by a query handling arrangement in a federated database system. The database system comprises data storing applications configured to store data in corresponding databases and the query handling arrangement comprises
a query handling device comprising
a profile handling unit in turn comprising a query investigating element configured to
receive a database query from a query generating application concerning the obtaining of data from the databases,
obtain usage profiles regarding allowed use of the data in the databases provided by a usage profile announcing device,
investigate the usage profiles,
obtain data from the databases according to the obtained usage profiles, and
respond to the query with the obtained data.

This object is according to a second aspect also achieved by a method for handling queries in a federated database system. The method is performed in a query handling arrangement of the system and comprises the steps of:
receiving a database query from a query generating application concerning the obtaining of data from the databases,
obtaining usage profiles regarding allowed use of the data in the databases provided by a usage profile announcing device,
investigating the obtained usage profiles,
obtaining stored data according to the obtained usage profiles, and
responding to the query with said obtained data.

The object is according to a third aspect of the invention also achieved through a computer program for handling queries in a federated database system. The computer program comprises computer program code which when run in a query handling arrangement causes the query handling arrangement to:
receive a database query from a query generating application concerning the obtaining of data from the databases,
obtain usage profiles regarding allowed use of the data in the databases provided by a usage profile announcing device,
investigate the obtained usage profiles,
obtain stored data according to the obtained usage profiles, and
respond to the query with said obtained data.

The object is according to a fourth aspect furthermore achieved by a computer program product for handling queries in a federated database system, where the computer program product is provided on a data carrier and comprises the computer program code according to the third aspect.

The invention according to the above-mentioned aspects have a number of advantages. Exposable information may be easily created using a meta-data based approach. The use of usage profiles enables the provision of a number of attractive features. Information may as an example be grouped according to the application to which it is exposed. It is also possible to pinpoint query generating applications for particular pieces of information and thereby imposing security of access. Large scale information transfer sharing may be obtained fast. Information discrepancy may be avoided as there are no two copies of the same information.

Information may be available real-time and may help create a new breed of applications. New information can easily be added or deleted by modifying the usage profile eliminating the need for a code change in the applications.

In an advantageous variation of the first aspect, the profile handling unit further comprises a query profile forming element configured to combine the usage profiles that are related to the query from the query generating application into a query profile and provide the query profile to the query generating application.

In a corresponding variation of the second aspect, the method further comprising combining the usage profiles of the data storing applications that are related to the query from the query generating application into a query profile and providing the query profile to the query generating application.

According to a further variation of the first aspect, the query investigating element is further configured to investigate, when receiving the quer, if there is a corresponding query profile, and provide data from the databases based on this query profile if there is.

According to a corresponding variation of the second aspect, the method further comprises investigating, when receiving the query, if there is a corresponding query profile, and responding with the data from the databases based on this query profile if there is.

A usage profile may comprise group describing data set by the usage profile announcing device.

According to yet another variation of the first aspect, the query investigating element may, when investigating obtained usage profiles, be configured to investigate the group describing data for a match with the query.

According to a corresponding variation of the second aspect, the investigating of selected usage profiles then comprises investigating the group describing data for a match with the query.

The group describing data may furthermore comprise a name of a group and metadata describing the name.

According to a further variation of the first aspect, the query investigating element may, when investigating obtained usage profiles, be configured to investigate the group name and possibly also the metadata for a correspondence with the query.

According to a corresponding variation of the second aspect, the investigating may then comprise investigating the group name and possibly also the metadata for a correspondence with the query.

A usage profile may furthermore comprise access right settings.

According to yet another variation of the first aspect, the query investigating element when obtaining data from a database is configured to obtain data according to the access right settings for this database.

According to a corresponding variation of the second aspect, the obtaining of data from a database comprises obtaining data according to the access right settings for this database.

According to a further variation of the first aspect, the query handling device further comprises a profile library and the query investigating element is further configured to store the obtained usage profiles in the profile library.

According to another variation of the first aspect, the arrangement further comprises a usage profile announcing device configured to generate a usage profile and provide this usage profile to the query handling device.

According to a corresponding variation of the second aspect, the method further comprises providing, from a usage profile announcing device to a query handling device, a usage profile concerning access to data in at least one corresponding database.

According to yet another variation of the first aspect, the query investigating element is configured to connect to the usage profile announcing device, receive database locating information as a response and employ the database locating information when obtaining data from the databases.

According to a corresponding variation of the second aspect, the method further comprises connecting to the usage profile announcing device, receiving database locating information as a response and employing the database locating information when obtaining data from the databases.

According to yet a further variation of the first aspect, wherein the profile handling unit comprises a data processing element configured to process data obtained from the databases for replying to the query with processed data.

According to a corresponding variation of the second aspect, the method further comprises processing data obtained from the databases for replying to the query with processed data.

According to another variation of the first aspect, the query handling device further comprises a data storing unit configured to receive data from the applications, determine corresponding databases and store the data in these databases.

According to a corresponding variation of the second aspect, the method further comprises receiving data from the applications, determining corresponding databases and storing the data in these databases.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits and methods are omitted so as not to obscure the description of the invention with unnecessary detail.

Embodiments of the invention are directed towards a federated database system where there may exist one or more applications sending queries to several databases. In such a system an application should not have to deal with the details of the data storing in the databases. An application should thus be able to operate in the same way in respect of all databases irrespective of the different types that exist. Furthermore, queries should be handled in an efficient manner for avoiding bottlenecks.

Figure 1:
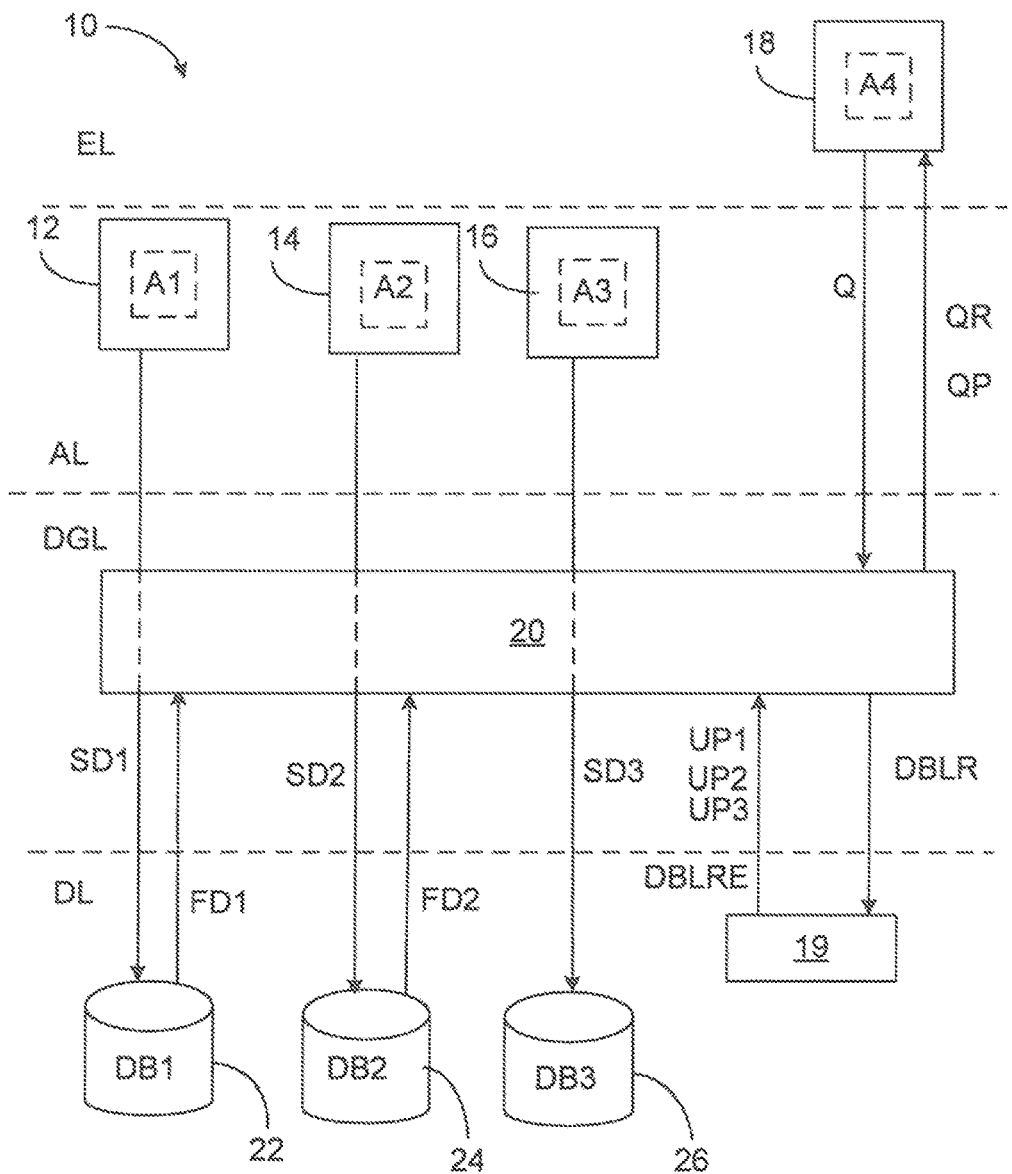
FIG. 1 schematically shows a number of data storing devices comprising data storing applications, a query generating application in a query generating device, a number of databases as well as a query handling device.

In FIG. 1 there is shown a federated database system 10, comprising a number of data storing devices.

The federated database system 10 may be a part of a larger system, such as a mobile communication system, like Long Term Evolution (LTE) or Wideband Code Division Multiple Access (WCDMA). A mobile communication system may furthermore comprise a radio access network and a core network, where the core network may provide core network functionality such as keeping track of mobile terminals and their locations. This type of functionality may be based on one or more home location registers (HLR) that may need to use the databases of the federated database system 10. It is also known for various types of third party application servers connecting to such a mobile communication system. Also these servers may need to employ the federated database system 10.

In the federated database system 10 there is a first data storing device 12, a second data storing device 14 and a third data storing device 16. In each of these data storing devices 12, 14 and 16 there is furthermore running a data storing application which stores data in a corresponding database. There is here a first data storing application A1 in the first data storing device 12, a second data storing application A2 in the second data storing device 14 and a third data storing application A3 in the third data storing device 16. The data storing devices are furthermore provided in an application layer AL of the database system 10. The data storing applications are configured to store data in corresponding databases. Therefore, the first application A1 stores first data SD1 in a first database DB1 22, the second application A2 stores second data SD2 in a second database DB2 24 and the third application A3 stores third data SD3 in a third database DB3 26. The first database 22 may be an Hbase database, the second database may be a PostgresSqL database and the third database may be a Grapg database. The databases 22, 24 and 26 may furthermore be provided in a data layer DL of the system. It should be realized that the database types mentioned above are merely examples of database types that may be used.

The storing of the data is furthermore performed under the mediation of a query handling device 20. The data from the applications is thus sent to the query handling device 20, which in turn locates the appropriate database an then stores the data SD1, SD2 and SD3 in the located databases 22, 24 and 26. An application may furthermore store data in more than one database.

The databases 22, 24 and 26 may all comprise processors such as central processing units (CPU) and data-stores in the form of memories.

There is furthermore at least one usage profile announcing device 19. In the embodiment depicted in FIG. 1 there is one usage profile announcing device 19. This device 19 provides usage profiles in relation to the use of data in databases. The usage profiles regulate the use of data in the databases. In the example of FIG. 1, the usage profile announcing device 19 is provided in the data layer DL. The usage profiles may be provided in relation to applications. They may also be provided in relation to databases. Therefore the usage profile announcing device 19 may be provided in the data layer DL as well as in the application later AL. An alternative placing of the usage profile announcing device 19 is thus in the application layer AL. There may furthermore be more than one usage profile announcing device. There may for instance be one per data storing application. Alternatively there may be one per database. A usage profile announcing device may furthermore be a part of a data storing device or part of a database.

In the example given in FIG. 1, the usage profile announcing device 19 is a separate device that provides a first usage profile UP1 related to the first application A1, a second usage profile UP2 related to the second application A2 and a third usage profile UP3 related to the third application A3. All these usage profiles are sent from the profile announcing device 19 to the query handling device 20. The usage profile announcing device is furthermore shown as receiving a data base location request DBLR as well as sending a database location response DBLRE to the query handling device 20.

As may be seen in FIG. 1, the query handling device 20 is provided in a data grid layer DGL through which data transfer between applications and databases is controlled. The query handling device 20 is shown as communicating with a fourth query generating application A4 in a query generating device 18. In the figure the query handling device 20 is seen as receiving a query Q from the fourth application A4, fetching first data FD1 from the first database 22, fetching second data FD2 from the second database 24 and responding to the query Q with a query response QR and a query profile QP. The query generating device 18 is further provided in an enterprise layer EL of the system 10.

Figure 2:
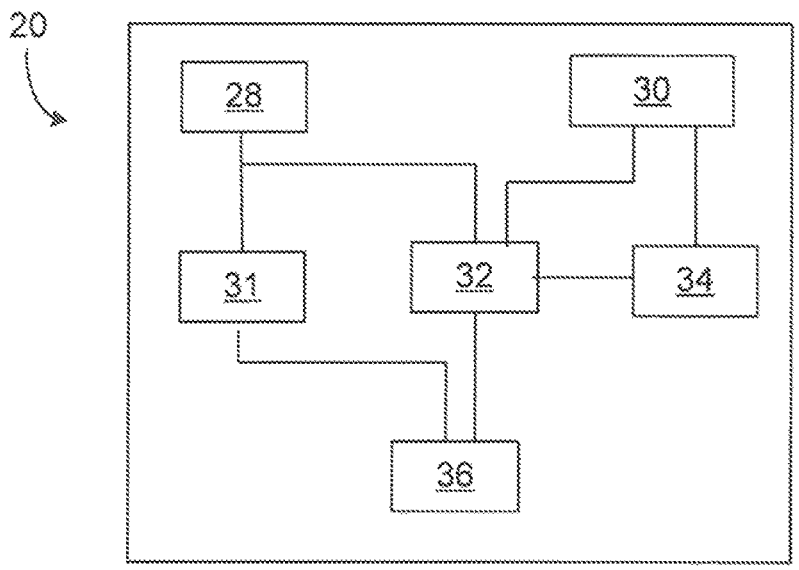
FIG. 2 shows a block schematic of the query handling device.

FIG. 2 shows a block schematic of the query handling device 20. It comprises a first communication interface 28 for communicating with entities in the application layer like the data storing applications, a second communication interface 30 for communicating with query generating applications and a third communication interface 36 for communicating with databases and the usage profile announcing device 19. It also comprises a profile handling unit 32, which is connected to all these interfaces as well as to a profile library 34. The profile library is also connected to the second communication interface 30 in order to provide an Application Programming Interface (API). There is also a data storing unit 31 connected between the first and the third interfaces 28 and 36. It should here be realized that the data storing unit 31 need not be a part of the query handling device, but may be provided as a separate device in the data grid layer DGL.

Figure 3:
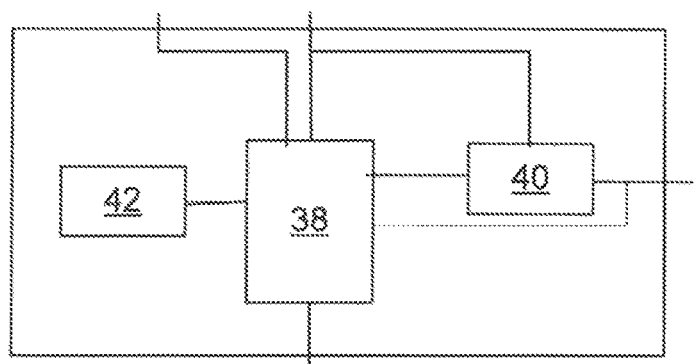
FIG. 3 shows a block schematic of a profile handling unit in the query handling device, FIG. 4 schematically shows an exemplifying usage profile provided by a usage profile announcing device.

FIG. 3 shows a block schematic of the profile handling unit 32. It comprises a query investigating element 38 that is connected to the first, second and third interfaces as well as to the query library. There is furthermore an optional query profile forming element 40 connected between the query investigating element 38 and the query library 34 as well as an optional data processing element 42 connected to the query investigating element 38.

Figure 4:
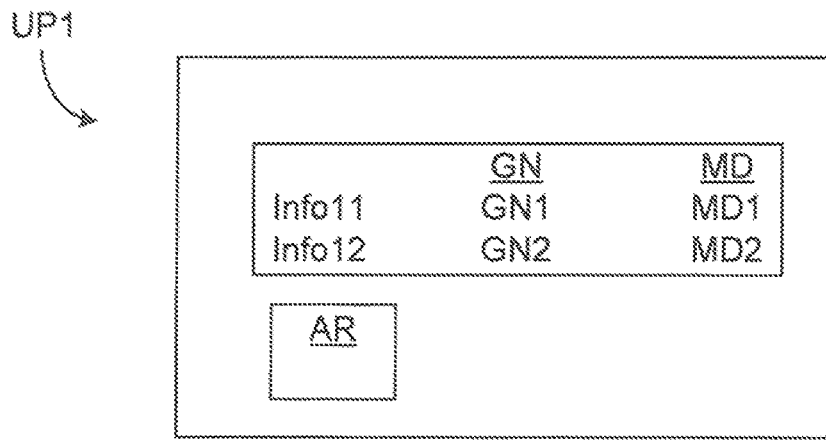

FIG. 4 schematically shows one exemplifying usage profile, which is the first usage profile UP1. The first usage profile UP1 comprises information concerning groups of an associated database in which data is stored, which groups are accessible to query generating applications. A group may be a row or a column of a database. The usage profile UP1 comprises a list of information items. There is here a first information item info11 and a second information item info12, where each information item is associated with a data group. These information items are group describing data set by the data storing application for describing the groups. The group describing data may furthermore comprise a name of a group and metadata describing the name. The first information item info11 therefore comprises a first group name GN1 and first metadata MD1 associated with the first group name GN1. The second information item info12 comprises a second group name GN2 and associated second metadata MD2. In this example there is thus first meta data MD1 associated with the first group name GN1 and second meta data MD2 associated with the second group name GN2. The metadata may comprise information describing the nature of the data present in the group with the group name, where the group may be a column or row of a table of the database. The group name may thus be the name of a column or row in a database. The first usage profile UP1 also comprises an optional access rights setting AR, indicating the type of access allowed by query generating applications to the above mentioned groups. The access rights may indicate that access is denied. The access rights may thus comprise a barring of access. It is furthermore possible with different access rights to different groups of one database.

The exemplifying three applications A1, A2 and A3, which have their own databases each consume some data and produce data that is stored in the corresponding databases.

The storing may, as was described above take place through the aid of the data storing unit of the data grid layer, which receives data from the data storing applications and stores the data in the corresponding databases. For this purpose the data storing unit may have knowledge of which database or databases a data storing application stores data in and may then, when receiving such data from a data storing application, store the data in the associated database (s). There may as an alternative be one or more data storing units in the data grid layer DGL, for instance one per data string application.

A scheme describing how the data and information is structured inside the database of each application has traditionally only been known to that application. Sharing information has until now basically been achieved by sending information events between the data storing applications through proprietary protocols or through standard protocols like SOAP.

There may be some problems associated with this type of information sharing.

1. The information produced by one application is shared to other applications only through pre-defined protocols, either proprietary or standard ones like SOAP. So there exists a tight coupling between applications which make changes of them expensive and complex.
2. Sharing large-scale data is very difficult.
3. Because data is moved from one database to another in a pre-defined time period, there will be a discrepancy between the actual data and the shared data.

Embodiments described herein are directed towards explaining a technical solution to the above-mentioned problem through which information in any application is securely shared across many other applications and to the enterprise as a whole. According to these embodiments a "meta-data oriented" information exchange is defined throughout the entire system using the query handling device, which is provided in the data grid layer, which is also termed a federated data layer.

Some embodiments of the invention thus employ a federated data layer. The principle of the federated data layer is to instead of having multiple databases managed by each application independently, there is a common data layer which federates accessing the data or information towards the application layer. The data grid layer may then manage the scheme so that it knows which data is stored where, in which format and belongs to which application.

Two components of embodiments are the usage profile announcing device and the query handling device. The usage profile announcing device may in some instances also be termed a data exporter library, which can be installed in an application to enable the application to expose information to other applications or to the query handling device.

The usage profile announcing device may provide an API, via which usage profiles and query profiles may be obtained.

Meta data oriented information exchange is achieved by applications, using the above-mentioned usage profile announcing device to expose the information of the application. Assume for instance that the first application A1 produces the previously mentioned information info11, info12 describing data groups in a database. Similarly the second application A2 may produce info21, info22 and the third application A3 may produce info31, info32 describing some of their groups. The first application A1 may chose to expose info11 and info12, the second application A2 may choose to expose info21 and the third application A3 may chose not to expose any information. Applications may then expose their information through the usage profile announcing device. An application using the usage profile announcing device, can choose to expose all its information or only a certain portion of its information. Information that is exposed by the usage profile announcing device can then be accessed by other applications using standard protocols like Thrift, Protocol Buffers etc. In the above example, the second application A2 can access info11 exposed by the first application A1 using Thrift or Protocol Buffers. Since the first application A1 has exposed the metadata (scheme) of info11, the second application A2 need not contact the first application A1 every time for data access. Instead, it can directly access the data in the group identified by info11 from the first database 22 after having consulted the usage profile announcing device. It may here also be mentioned that also the profile library of the query handling device may be accessible to applications via the first or the second interfaces and thereby also provide an API.

Applications sharing data should employ a usage profile announcing device in order to enable transfer of usage profiles from applications to the query handling device 20 of the federated data layer. Usage profiles may be announced using standard protocols like Thrift etc.

In order to expose information of a data storing application the usage profile announcing device 19 may need to provide the usage profile, which may also be termed a profile card, for each group of information that needs to be exposed.

The usage profile announcing device 19 can attach permission on which query generating applications are allowed to access the information, of the provided usage profile and thereby also the corresponding data of the associated database. The permission may also be time based setting out when access is granted. By doing this, the usage profile announcing device 19 can expose any kind of information using the data it possesses to other applications and to the enterprise information tier. Applications that are accessing these usage profiles need not know where or how this information is structured or stored. This also helps in ad-hoc sharing of information without changing the application business logic.

The usage profile may be a template which the applications sharing data have to fill via the usage profile announcing device 19, in order to expose their data to other applications and the query handling device 20. A usage profile may comprise certain basic details about the data being shared.

The usage profile announcing device 19 can give a name to each of the usage profiles it creates. Name of the usage profile can be a short one line description of the shared data. This kind of naming helps the query handling device 20 in searching usage profiles efficiently. The usage profile announcing device 19 can choose to share entire tables or specific data groups, such as specific columns or rows of a table. Descriptions about the columns/tables and names of tables/columns shared should be mentioned in the usage profile. Also security restrictions like giving only read permission for other applications than the one for which the usage profile is generated can be mentioned or completely barring access. In addition, restrictions like type of applications to which data should be exposed can also be provided. If names of specific query generating applications to which data should be exposed are known, these names may also be exposed.

It can thus be seen that the usage profile announcing device 19 generates usage profiles for one or more of the data storing applications and then provides these generated usage profiles UP1, UP2 and UP3 to the query handling device.

Figure 5:
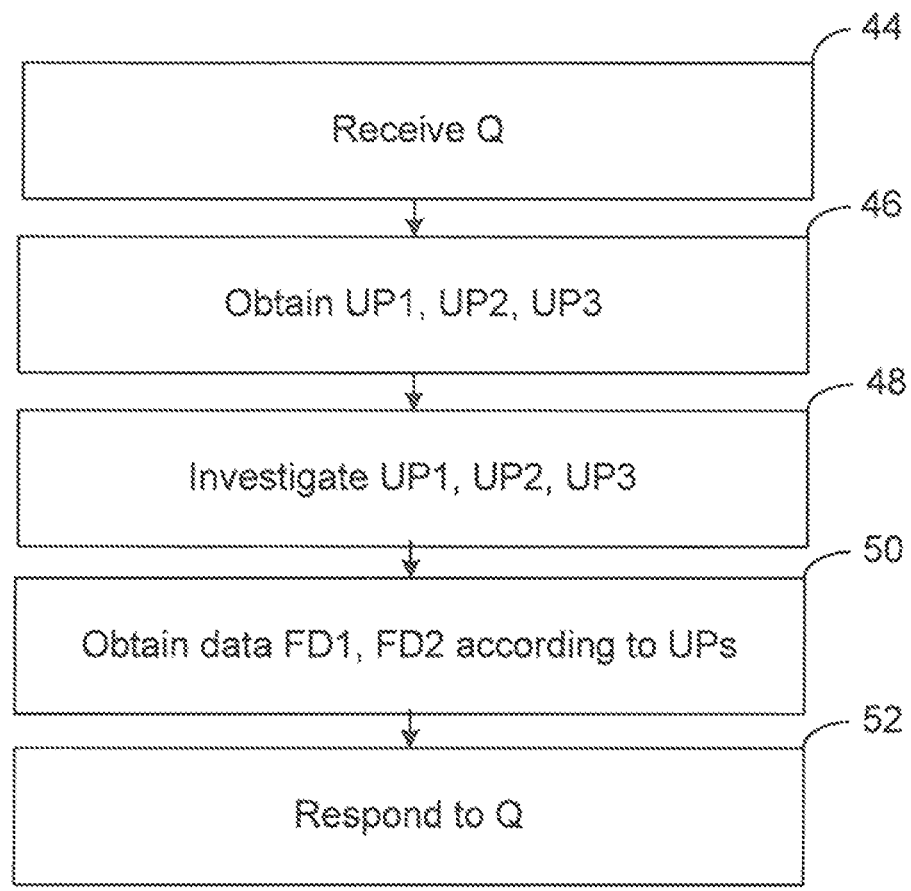
FIG. 5 shows a flow chart of a first embodiment of a method for handling queries in a federated database system.

Now a first embodiment of the invention will be described in more detail with reference also being made to FIG. 5, which shows a flow chart of a number of method steps being performed by the query investigating unit 32 in the query handling device 20.

The exemplifying three applications A1, A2 and A3, produce data that is stored in the corresponding databases 22, 24 and 26.

The storing does in this example take place through the aid of the data storing unit 31 in the data grid layer DGL. The data storing unit 31 may receive data from the data storing applications A1, A2 and A3 via the first interface 28, determine, based on the data and the application from which it receives the data, in which database the data is to be stored and thereafter stores the data in the corresponding database via the third interface 36. The data storing unit 31 may as an example receive said first data SD1 from the first application A1 and store it in the first database 22, receive said second data SD2 from the second application A2 and store it in the second database 24 as well as receive said third data SD3 from the third application A3 and store it in the third database 26.

The usage profile announcing device 19 furthermore provides usage profiles UP1, UP2 and UP3 to the query handling device 20, which usage profiles sets out if and what data is accessible to query generating applications. They thus concern the allowed use of the data in the databases. In this example the usage profiles UP1, UP2 and UP3 are also generated in relation to the first, second and third applications A1, A2 and A3. A usage profile, which thus concerns access to data in at least one corresponding database, may, as was discussed earlier, be exposed to the query handling device 20 through the usage profile announcing device 19 providing an API, via which the usage profiles are accessed. The usage profiles may furthermore be sent from the usage profile announcing device 19 to the query handling device 20 via a secure connection, i.e. using encryption. The query investigating element 38 in the profile handling unit 32 of the query handling device 20 may therefore collect usage profiles concerning all the data storing applications A1, A2 and A3 deployed in the federated environment. As an alternative the usage profiles may be sent to the query handling device 20 after having been set by the usage profile announcing device 19. The query investigating element 38 may then store the received usage profiles UP1, UP2 and UP3 in the profile library 34.

In the query handling device 20, the query investigating element 38 may continuously receive queries from query generating applications, where these applications may be provided in the enterprise layer. The queries are furthermore received via the second communication interface 30. The query investigating element 38 does for instance receive a database query Q from the fourth query generating application A4, step 44, which query is a query concerning the obtaining of data from the databases 22, 24 and 26.

In order to determine which data, if any, that the fourth application A4 is allowed to receive, the query investigating element 38 then obtains usage profiles UP1, UP2 and UP3 associated with the data storing applications A1, A2 and A3 in the system, step 46. In this example it thus obtains usage profiles provided for the data storing applications of the system 10. The usage profiles may be obtained via the third communication interface 36. The obtaining may be performed through requesting usage profiles from the usage profile announcing device 19 or through the usage profile announcing device 19 announcing the presence of the usage profiles to the query handling device 20.

The query investigating element 38 then investigates the usage profiles UP1, UP2 and UP3 with regard to the received query Q, step 48. The investigation may involve investigating the data that the query concerns and the settings in the usage profiles regarding that data. It may more particularly involve investigating the group describing data info11, info12 and it may especially involve investigating the group describing data for finding a match with the query. The query investigating element 38 may further investigate the group name and possibly also the metadata for a correspondence with the query. The investigation may therefore involve investigating the group names and meta data associated with the group names in finding out which database groups that are applicable for the query.

Thereafter the query investigating element 38 fetches data FD1 and FD2 from the databases based on the settings in the relevant usage profiles, step 50, which fetching is performed via the third communication interface 36. The usage profiles may lack database information. This means that it may not be possible to know which database to access. Therefore the query handling element 38 may connect to the usage profile announcing device 19 in order to receive database location information. The connection may be obtained through sending a database location request DBLR to the usage profile announcing device 19 regarding the databases associated with an investigated usage profile and receive a database location response DBLRE setting out the databases as a response, whereupon the fetching ensues employing the received database location information, which may be the IP address of the database.

The query investigating unit thus obtains data FIX, FD2 from the databases 22, 24 and 26 according to the obtained usage profiles UP1, UP3. Thereafter the query investigating unit 32 responds to the query Q with a query response QR comprising the data that has been fetched, step 52. It thus responds to the query with the obtained data FD1 and FD2.

Figure 6:
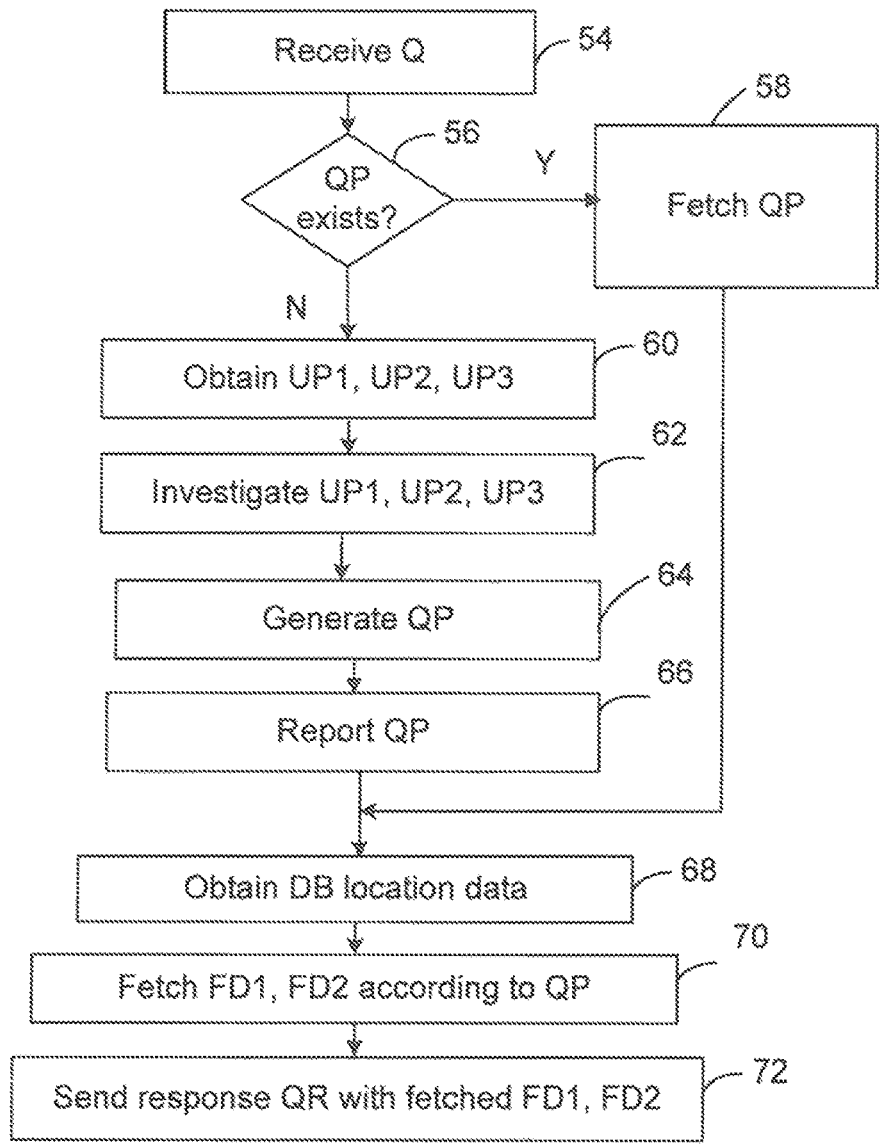
FIG. 6 shows a flow chart of a second embodiment of a method for handling queries in a federated database system, and FIG. 7 schematically shows a computer program product comprising a data carrier with computer program code for implementing the method for handling queries in a federated database system.

A second embodiment will now be described with reference being made to FIG. 6, which shows a second flow chart of a method being performed by the query investigating unit 32 of the query handling device 20.

This method also starts with the query investigating element 38 of the query handling device 20 receiving a query Q via the second communication interface 30, step 54. It thereafter investigates if there exists a previously created query profile QP for the query Q, step 56. The query investigating element 38 is thus configured to investigate, when receiving the query Q, if there is a corresponding query profile. This investigation may be performed through looking in the profile library 34. If one exists, step 50, then this query profile QP is fetched, step 58. Location data of the databases in the query profile are then obtained from the usage profile announcing device 19, step 68, followed by fetching data FD1, FD2 according to the settings of that query profile QP from the databases, step 72. In this case the query investigating element 38 is thus configured to provide data from the databases 22, 24, 26 based on the query profile if it exists.

However, if no query profile QP exists, the usage profiles UP1, UP2 and UP3 associated with the applications A1, A2 and A3 are obtained, step 60, for instance via an encrypted connection with the usage profile announcing device 19. These may then be stored in the profile library 34. Thereafter the usage profiles are investigated, step 62. This investigation may comprise an investigation of a correspondence between settings in the query Q and the information describing data groups of the usage profile. It may for instance involve detecting a match of the rows that have names corresponding to data requested in the query and an investigation of the meta data regarding further correspondence.

It may also involve an investigation of the access right settings AR, which access right settings AR may indicate what type of query generating applications are allowed to access data in the data groups.

Assume as an example, when the system is provided in a telecommunication network, that a query Q stating "Financial report about customer base is needed with demographic information like name, age, address and aggregated monthly usage of every customer" arrives in the query investigating element 38 from an application in the enterprise layer. The query investigating element 38 understands that the information required will be found in the groups named customer-name, customer-age, customer-address and customer-aggregated-monthly-usage. This finding can be made through any conventional Structured Query Language (SQL) parsing technique or Natural Language Processing (NLP) technique based on the type of query. The query handling device may then scan all the usage profiles for terms like "demographic information", "age", "name", "address", "usage". Assume that it has found a usage profile with the name demographic information and it has found details like name, age and address in the usage profile. Usage details may then be found in another usage profile. The query handling device 20 may then check if the query generating applications in enterprise layer have security access to these groups by scanning through the security restrictions provided by the access right settings AR in the matched usage profiles.

If exact names of groups do not match with the search terms, the query investigating element 38 may try to match the terms being searched with the metadata of the usage profiles. For example in the above mentioned query Q, if the term usage is not found in the name of any of the usage profiles, the metadata (description about rows or columns) of all usage profiles may be scanned to match the term "usage" and a suitable usage profile with the term "usage" is selected.

The results of the investigations is also forwarded from the query investigating element 38 to the query profile forming element 40. Based on the investigations of which data groups correspond to the received query Q and based on the corresponding access rights settings AR for the query generating application, the query profile forming element 40 then generates a query profile QP for the query Q, setting out which fields of which table is accessible for the query generating application A4, step 64. The query profile forming element 38 may thus combine the usage profiles of the data storing applications that are related to the query Q from the fourth query generating application A4 into a query profile QP. The query profile QP is then stored in the profile library 32 by the query profile forming element 40 and furthermore also made accessible to the fourth application A4, step 66, as an example using an encrypted connection. The query profile forming element 40 of the query handling unit 32 thereby provides the query profile to the query generating application A4. At the same time the query investigating element 38 may store data indicating which usage profiles the query profile has been based on. This may be used for later obtaining of database location information in relation to a query profile.

Thereafter the query investigating element 38 obtains database location data from the usage profile announcing device 19, step 68, which may be done with an encrypted connection. The query handling element 38 may thus send a database location request DBLR to the usage profile announcing device 19 regarding the databases associated with the investigated usage profiles and more particularly with the usage profiles that allow access to the query generating application A4. It is for instance possible that the database location request is sent only regarding the databases that are allowed for the query generating application A4. It is thus possible to omit asking for database location data regarding a database for a usage profile that denies access for a query generating application. After a database location request DBLR has been sent, the query handling element 38 then receives a database location response DBLRE with database location information setting out the databases from which data is to be fetched.

Thereafter the query handling element 38 fetches data FD1, FD2 according to the query profile QP from the databases using the database location information, step 70. Data is thus obtained from a database according to the access right settings for this database. Also here encryption may be used. After the data has been fetched a response QR is then sent to the fourth application A4, step 72, which response comprises the fetched data.

Therefore, if the enterprise layer has access to data according to the usage profiles, the query investigating element may collect all details from all usage profiles and create a query profile to be exposed to the enterprise layer. As can be seen in FIG. 3, the profile handling unit 32 comprises a data processing element 42. The query investigating element 38 may send fetched data to the data processing element 42, which may process the data, i.e. perform operations on it, such as aggregation or averaging. The processed data may then be returned to the query investigating element 38 for reporting to the query generating application. The type of processing that is performed may also be specified in the query profile that is created and shared with the enterprise layer.

A telecom example may be as follows. Assume that a Business analyst of a telecom service provider employing a query generating application needs complete information about a user to analyse the revenue generated from the user. Business analyst requires details like User creation date, Average usage per month, Average refill per month etc. Various data storing applications like service delivery platform (SDP) (user profile) and Charging system (usage and refill details) may then hold the information requested by the analyst. Assume that SDP has exposed the user profile and Charging/Reporting system has exposed the usage/refill details through data exporter library. The query handling device 20 may now access user profile and usage/refill details from the database through a standard protocol (say Protocol Buffer), extract required details like user creation date from the information, perform basic operations like aggregation, average etc. on usage/refill details and create a query profile. This query profile may then be exposed to the Business analyst. If a third party application (say Advertisement agency) requests the same query profile, the query handling device may thereafter stop the query profile from being exposed to the third party application due to a security violation. The query handling device 20 may also make some basic settings in the query profile (e.g. periodically create/refresh frequently accessed usage profiles).

A third-party application example may be as follows. Assume that an advertisement application in the enterprise layer queries the query handling device for basic details of all users in a particular region. The query handling device may then access the basic information like subscriber name, age, mobile number, gender through the data exporter API and form a query profile with only these basic details and expose it to the advertisement application.

A query profile may be created through grouping similar information. The user/enterprise layer may describe to the query handling device about the details that it requires as a query profile. In the above mentioned example, an enterprise layer can instruct the query handling device 20 that it needs information I, which is a combination of info11 and info21, where info11 is found in the first usage profile UP1 and info21 is found in the second usage profile UP2. The query handling device 20 may then check if the enterprise layer has access to info11 and info21. If there is access, it may create a query profile by combining info11, info21 and expose it to the user. The query handling device 20 may use standard protocols like Thrift to access data from the database. It need not have knowledge about the application from which the information info11 and info21 are produced because the usage profile announcing device provides an API to access data and the schema of info11 and info21 is already exposed. The query handling device may therefore use the API to 1. Access information from the database
2. Perform basic operations (like aggregation, average etc.,) on the information to form derived information from the extracted information.
3. Create a query profile using the information obtained through the API and derived information (information got by performing operations like aggregation, average etc.,).
4. Expose the query profile to user/enterprise layer.

Security pertaining to data access can be added at two levels. The application can expose data only to selected users or the data grid can add security to usage profiles by exposing it only to certain users. For example, the query handling device can expose usage profiles only to telecom applications. It can block access to usage profiles for other third party applications like advertisement applications to protect data privacy.

Following are the clear advantages of the invention considering the previous description.

1. Applications can easily create exposable information using a meta-data based approach. They just have to define the data to be collected to arrive at the information.
2. Information can be grouped according to the application to which it is exposed. Example: for internal applications it can be more detailed, for external third party application it can be more abstract to preserve privacy.
3. A data storing application acting as a source application may choose to which query generating target application(s) acting as target application(s) a particular piece of information can be exposed thereby imposing security of access.
4. Large scale Information transfer sharing will not take more time to transfer and more space as data will be stored in the same federated database and not transferred like in the traditional approach.
5. No information discrepancy will be felt as there are no two copies of the same information.
6. Information will be available real-time and will help create a new breed of applications (ex: exposing on the act data of a consumer to customer care)
7. New information can be added or deleted by modifying the usage profile eliminating the need for a code change in the application side.

There are a number of possible variations that may be made in addition to those already mentioned. It is possible that a usage profile is obtained by the query handling device before a query is received. It is furthermore possible that one or more data storing applications are also query generating applications. These may therefore need to access data from another data storing application in relation to itself storing data in a database.

The query handling device may be provided in the form of a processor with associated program memory including computer program code for performing the functionality of the query handling device. Also the data storing devices as well as the usage profile announcing device may be provided in this way.

The query handling device may furthermore form a query handling arrangement together with one or more usage profile announcing devices as well as or instead perhaps also with one or more of the data storing applications. A query handling arrangement may thus comprise the query handling device and at least one usage profile announcing device and/or at least one data storing device.

Figure 7:
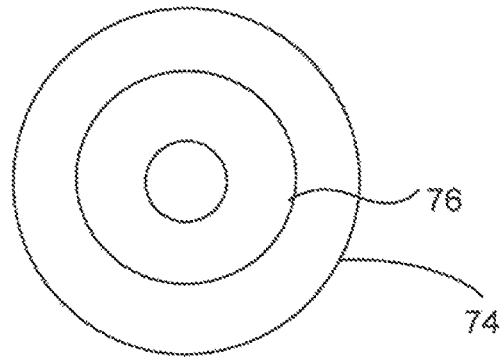

A computer program may also be a computer program product, for instance in the form of a computer readable storage medium or data carrier, like a CD ROM disc or a memory stick, carrying such a computer program with the computer program code, which will implement the functionality of the above-described query handling device. One such data carrier 74 with computer program code 76 is schematically shown in FIG. 7.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. A query handling arrangement of computing devices in a federated database system comprising communication layers in which the computing devices operate, the federated database system comprising data storing applications configured to store data in corresponding databases in the federated database system, wherein the data storing applications operate in a first communication layer of the communication layers and the databases operate in a second communication layer of the communication layers, the query handling arrangement of computing devices comprising:
- a query handling device operating in a third communication layer of the communication layers comprising at least one processor and memory configured to:
  - receive a database query from a query generating application operating in a fourth communication layer of the communication layers, the query comprising a request to obtain data from the databases operating in the second communication layer,
  - establish a connection to a data usage profile announcing computing device of the computing devices operating in the second communication layer,
  - responsive to establishing the connection, receive, from the data usage profile announcing computing device, one or more data usage profiles defining allowed use of the data by the query generating application and location information identifying a location of one or more databases identified in the data usage profiles in the federated database system, wherein the location information comprises addresses of the one or more databases in the second communication layer of the federated database system,
  - determine at least one of the data usage profiles of the one or more data usage profiles related to the database query,
  - transmit, to the one or more databases of the databases operating in the second layer identified in the at least one data usage profile, a request to obtain the data identified in the at least one data usage profile using the location information,
  - receive the obtained data from the databases operating in the second communication layer identified in the database query, and
  - transmit the obtained data to the query generating application to respond to the database query,
- wherein the second communication layer comprises a database layer of the federated database system and wherein the third communication layer comprises a data grid layer of the federated database system.

2. The query handling arrangement according to claim 1, wherein the query handling device is further configured to combine two or more of the data usage profiles that are related to the database query received from the query generating application into a combined query profile and transmit the combined query profile in the request to the one or more databases of the databases operating in the second layer identified in the at least one data usage profile.

3. The query handling arrangement according to claim 1, wherein a data usage profile comprises an identification of a group of data stored in one or more of the databases, the group of data defined by the usage profile announcing device; and
  - wherein the query handling device is further configured to determine the at least one data usage profile based on a match of the identification of the group of data to the database query.

4. The query handling arrangement according to claim 3, wherein the identification of the group of data comprises a name of a group and metadata describing the name, and wherein the query handling device is further configured to determine the at least one data usage profile based on a match of one of the group name and the metadata to the database query.

5. The query handling arrangement according to claim 1, wherein a data usage profile comprises access right settings for the one or more databases identified in the data usage profile and wherein the query handling device is further configured to receive the obtained data from the one or more databases operating in the second layer identified in the at least one data usage profile according to the access right settings in the data usage profile.

6. The query handling arrangement according to claim 5, wherein the query handling device further comprises a profile library is further configured to store the received data usage profiles in the profile library.

7. The query handling arrangement according to claim 1, wherein the data usage profile announcing device is further configured to generate a data usage profile and transmit the generated data usage profile to the query handling device.

8. The query handling arrangement according to claim 1, wherein the query handling device is further configured to process the data received from the one or more databases to reply to the database query with the processed data.

9. The query handling arrangement according to claim 1, wherein the query handling device further comprises a data storing unit configured to:
  - receive data from the data storing applications operating in the first layer,
  - determine corresponding databases of the databases operating in the second layer to store the received data from the data storing applications, and
  - store the data in the determined corresponding databases.

10. The query handling arrangement according to claim 1, wherein the first communication layer comprises an application layer of the federated database system.

11. The query handling arrangement according to claim 1, wherein the fourth communication layer comprises an enterprise layer of the federated database system.

12. The query handling arrangement according to claim 1, wherein the first communication layer comprises an application layer of the federated database system; and wherein the fourth communication layer comprises an enterprise layer of the federated database system.

13. The query handling arrangement according to claim 1, wherein each data storing application stores data only in a corresponding database operating in the second communication layer.

14. The query handling arrangement according to claim 1, wherein the addresses of the one or more databases comprise Internet Protocol (IP) addresses of the one or more databases.

15. A method for handling queries in a federated database system comprising communication layers in which the computing devices operate, the federated database system comprising data storing applications configured to store data in corresponding databases in the federated database system, wherein the data storing applications operate in a first communication layer of the communication layers and the databases operate in a second communication layer of the communication layers, the method being performed by a query handling device in a query handling arrangement of computing devices of the system operating in a third communication layer of the communication layers and comprising the steps of:
  - receiving a database query from a query generating application operating in a fourth communication layer of the communication layers, the query comprising a request to obtain data from the databases operating in the second communication layer, establishing a connection to a data usage profile announcing computing device of the computing devices operating in the second communication layer, responsive to establishing the connection, receiving, from the data usage profile announcing computing device, one or more data usage profiles defining allowed use of the data by the query generating application and location information identifying a location of one or more databases identified in the data usage profiles in the federated database system, wherein the location information comprises addresses of the one or more databases in the second communication layer of the federated database system, determining at least one of the data usage profiles of the usage profiles related to the database query, transmitting, to the one or more databases of the databases operating in the second layer identified in the at least one data usage profile, a request to obtain the data identified in the at least one data usage profile using the location information, receiving the obtained data from the databases operating in the second communication layer identified in the database query, and transmitting the obtained data to the query generating application to respond to the database query, wherein the second communication layer comprises a database layer of the federated database system and wherein the third communication layer comprises a data grid layer of the federated database system.

16. The method according to claim 15, further comprising combining two or more of the data usage profiles that are related to the database query received from the query generating application into a combined query profile and transmit the combined query profile in the request to the one or more databases of the databases operating in the second layer identified in the at least one data usage profile.

17. The method according to claim 16, further comprising receiving, from the data usage profile announcing device, a data usage profile concerning access to data in at least one of the corresponding databases.

18. The method according to claim 16, further comprising processing the data received from the one or more databases to reply to the database query with the processed data.

19. The method according to claim 16, further comprising:
receiving data from the data storing applications operating in the first layer,
determining corresponding databases of the databases operating in the second layer to store the received data from the data storing applications, and
storing the data in the determined corresponding databases.

20. The method according to claim 15, wherein a data usage profile comprises an identification of a group of data stored in one or more of the databases, the group of data defined by the usage profile announcing device; and
wherein the determining at least one of the data usage profiles comprises determining the at least one data usage profile based on a match of the identification of the group of data to the database query.

21. The method according to claim 20, wherein the identification of the group data comprises a name of a field and metadata describing the name, and
wherein the determining at least one of the data usage profiles comprises determining the at least one data usage profile based on a match of one of the group name the metadata to the database query.

22. The method according to claim 15, wherein a data usage profile comprises access right settings for the one or more databases identified in the data usage profile and wherein the receiving the obtained data from the databases comprises receiving the obtained data from the one or more databases operating in the second layer identified in the at least one data usage profile according to the access right settings in the data usage profile.

23. A computer program product for handling queries in a federated database system comprising communication layers in which the computing devices operate, the federated database system comprising data storing applications configured to store data in corresponding databases in the federated database system, wherein the data storing applications operate in a first communication layer of the communication layers and the databases operate in a second communication layer of the communication layers, the computer program product comprising a non-transitory computer readable data carrier storing computer program code which when run in a query handling arrangement of computing devices by at least one processor, causes the query handling arrangement to:

receive a database query from a query generating application operating in a fourth communication layer of the communication layers, the query comprising a request to obtain data from the databases operating in the second communication layer, establish a connection to a data usage profile announcing computing device of the computing devices operating in the second communication layer, responsive to establishing the connection, receive, from the data usage profile announcing computing device, one or more data usage profiles defining allowed use of the data by the query generating application and location information identifying a location of one or more databases identified in the data usage profiles in the federated database system, wherein the location information comprises addresses of the one or more databases in the second communication layer of the federated database system, determine at least one of the data usage profiles of the one or more data usage profiles related to the database query, transmit, to the one or more databases of the databases operating in the second layer identified in the at least one data usage profile, a request to obtain the data identified in the at least one data usage profile using the location information, receive the obtained data from the databases operating in the second communication layer identified in the database query, and transmit the obtained data to the query generating application to respond to the database query, wherein the second communication layer comprises a database layer of the federated database system and wherein the third communication layer comprises a data grid layer of the federated database system.

* * * * *